(12) United States Patent
Byrd et al.

(10) Patent No.: US 8,370,155 B2
(45) Date of Patent: Feb. 5, 2013

(54) SYSTEM AND METHOD FOR REAL TIME SUPPORT FOR AGENTS IN CONTACT CENTER ENVIRONMENTS

(75) Inventors: Roy J. Byrd, Ossining, NY (US); Keh-Shin Cheng, Mahopac, NY (US); Stephen Carl Gates, Redding, CT (US); Mary S. Neff, Montrose, NY (US); Youngja Park, Edgewater, NJ (US); Wilfried Teiken, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 850 days.

(21) Appl. No.: 12/428,987

(22) Filed: Apr. 23, 2009

(65) Prior Publication Data

US 2010/0274618 A1 Oct. 28, 2010

(51) Int. Cl.
*G10L 21/00* (2006.01)
*G10L 15/26* (2006.01)
*H04M 1/64* (2006.01)

(52) U.S. Cl. .......... 704/270; 704/9; 704/235; 379/88.01

(58) Field of Classification Search .................. None
See application file for complete search history.

(56) References Cited

U.S. PATENT DOCUMENTS

| | | | |
|---|---|---|---|
| 5,757,644 A * | 5/1998 | Jorgensen et al. ............. 700/83 |
| 5,970,449 A * | 10/1999 | Alleva et al. .................. 704/235 |
| 6,363,145 B1 | 3/2002 | Shaffer |
| 6,801,899 B2 | 10/2004 | Lauffer |
| 6,915,246 B2 * | 7/2005 | Gusler et al. .................. 703/5 |
| 6,922,689 B2 | 7/2005 | Shtivelman |
| 6,959,080 B2 * | 10/2005 | Dezonno et al. ........ 379/265.07 |
| 6,970,821 B1 * | 11/2005 | Shambaugh et al. ......... 704/270 |
| 7,099,855 B1 | 8/2006 | Nelken |
| 7,103,553 B2 | 9/2006 | Applebaum |
| 7,197,132 B2 * | 3/2007 | Dezonno et al. ........ 379/265.07 |
| 7,243,078 B1 | 7/2007 | Lewis-Hawkins |
| 7,283,974 B2 | 10/2007 | Katz |
| 7,487,095 B2 * | 2/2009 | Hill et al. ..................... 704/275 |
| 2005/0286705 A1 | 12/2005 | Contolini |
| 2006/0072727 A1 | 4/2006 | Bantz |
| 2008/0270142 A1 * | 10/2008 | Srinivasan et al. ......... 704/270.1 |
| 2009/0171668 A1 * | 7/2009 | Sneyders et al. ............. 704/275 |
| 2010/0124325 A1 * | 5/2010 | Weng et al. ............. 379/265.11 |

FOREIGN PATENT DOCUMENTS

WO WO 0246872 6/2002

OTHER PUBLICATIONS

Tang, et al, "Call-Type Classification and Unsupervised Training for the Call Center Domain", ASRU 2003, pp. 204-208, IEEE 2003.

* cited by examiner

*Primary Examiner* — Brian Albertalli
(74) *Attorney, Agent, or Firm* — Preston S. Young; Anne Vachon Dougherty

(57) ABSTRACT

A real-time method and system are described for automatically extracting text from the customer-agent interaction at a contact center, analyzing the extracted text to automatically identify one or more customer issues, and performing processing by contact-center agent buddies (CABs) to generate at least one response to the customer issues.

20 Claims, 8 Drawing Sheets

SYSTEM AND METHOD FOR REAL TIME SUPPORT FOR AGENTS IN CONTACT CENTER ENVIRONMENTS

FIELD OF THE INVENTION

The invention relates generally to automatic analysis of customer-agent interactions at a contact center and more specifically to automatically invoking contact-center agent buddies (CABs) to generate responses for use in the customer-agent interaction at a contact center.

BACKGROUND OF THE INVENTION

Most medium to large businesses operate customer contact centers to provide support services to customers. Modern contact centers often support various channels of communication for customer interactions, including telephony, e-mail, web-page forms and instant messaging. Telephony includes automatic call handling as well as call handling by human agents at the call centers.

Reduced costs, improved customer satisfaction and revenue growth are important concerns for contact centers. Most prior work on improving contact center operations includes automatic call routing or interactive voice response to direct a customer call to an appropriate agent who may handle the customer's issue most efficiently. However, the available approaches do not use analyses of the real-time interaction between customer and contact center agent to improve agent productivity at a contact center.

Contact center agents interacting with a customer spend large amounts of time on three tasks including (a) understanding the customer's request, (b) finding the right solution or the right process for a customer's request, and (c) documenting the interaction (i.e., the request and the response) in a customer relationship management system. In addition, other employees at the so-called "back end" of a contact center review data regarding past customer-agent interactions, for example from the information entered into the customer relationship management system, in order to do quality review and to identify areas for improvement. Still other back-end employees look at the customer interactions to identify both frequently-asked and new questions and will create new documents that agents can use for answering similar requests received in the future. Most improvements in the so-called "back end" operations at a contact center are directed to improving data management of agent-input data. Those approaches generally do not analyze the best information resource in the contact center, namely the content of the agent-customer interaction, including speech, e-mail text, a chat transcript, or any other content that is used for communication with the customer. Many contact centers use a customer relationship management (CRM) system to maintain customer interaction information, including the interaction summaries maintained by most contact centers.

It is, accordingly, an objective of the invention to provide automatic call analysis of contact center interactions to assist the agent in efficiently handling the interactions.

SUMMARY OF THE INVENTION

The present invention provides a method and system for providing automatic analysis of contact center interactions between customers and agents and to provide real-time support for the agent during the interaction. The invention does this by obtaining a speech record of a conversation between the customer and the agent, converting the speech record to a text record with a speech transcription system, identifying one or more customer issues from said text record and generating one or more responses per identified customer issue for outputting to the contact center agent, other contact-center personnel, or the customer. The system may be thought of as a framework, herein called the Contact-center agent buddies ("CAB") Framework, in which a variety of decision-proposing components, termed Contact-Center Agent Buddies or CABs, are invoked to provide real-time support of contact center agents based on the details of the customer interaction.

BRIEF DESCRIPTION OF THE DRAWINGS

The invention will now be described with reference to the accompanying figures in which.

DETAILED DESCRIPTION OF THE INVENTION

The method and system of the present invention automatically create text from the speech record of a customer-agent interaction, normalize the created text, and perform processing of the normalized text to assist the agent in handling the interaction.

Figure 1:
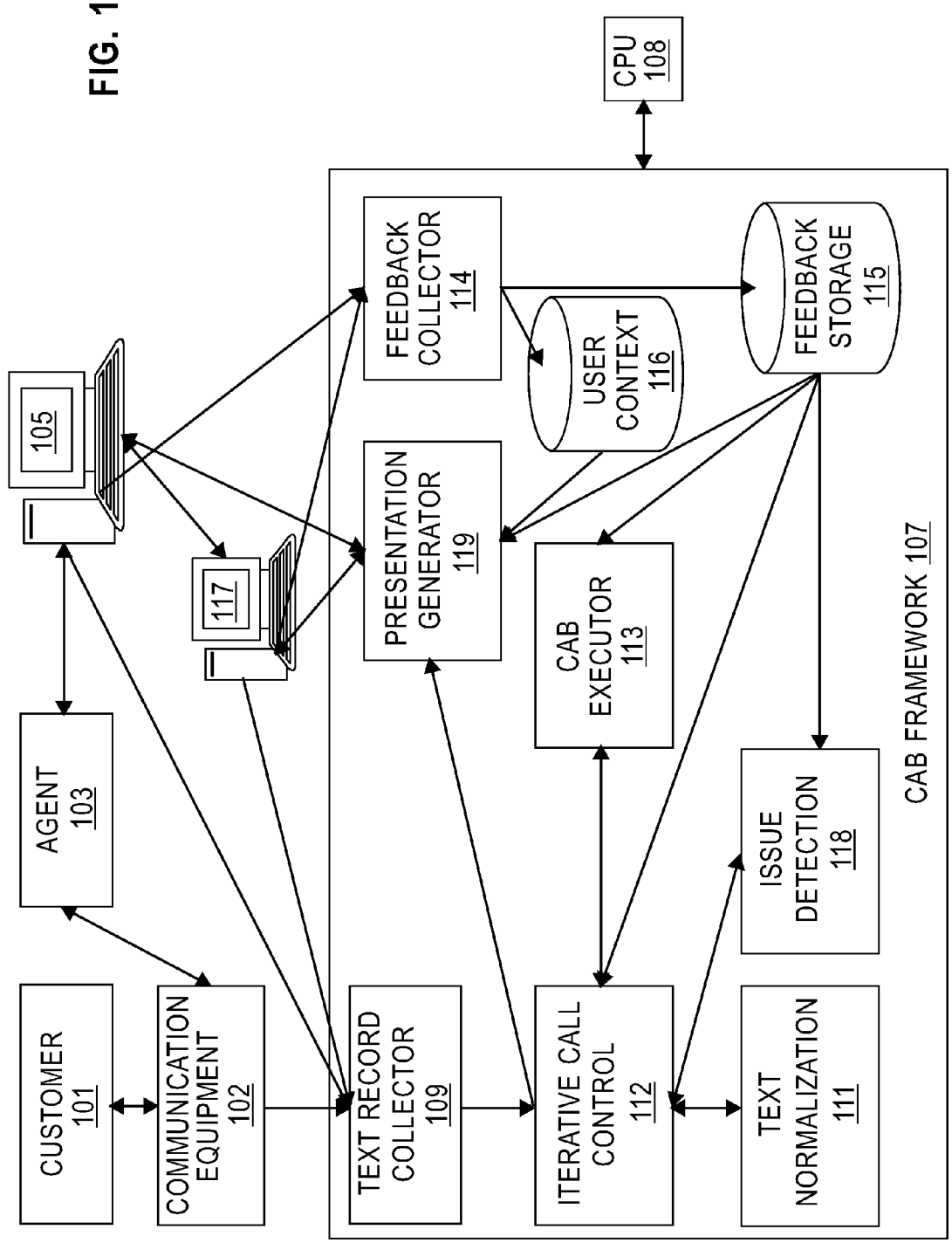
FIG. 1 is a block diagram of a system for implementing the present invention.

FIG. 1 is a block diagram illustrating a system for implementing the present invention. A contact center interaction between a customer 101 and a contact-center agent 103 is referred to hereinafter as an interaction or a series of interactions. The interaction may be via any of a number of means, including telephone, electronic chat systems, e-mail, or other textual means or means which may be converted to text. In a preferred embodiment, the contact-center agent is a human agent, but in other embodiments may be an automatic computer-based agent in a self-service system designed to answer customer questions without a human agent as an intermediary. The interaction is conducted involving communication equipment 102 which could be a phone switch, a network switch or any other technology transporting the communication. Regardless of the medium over which the customer and agent are communicating, the text of the interaction will be monitored by the inventive system, the Contact-center agent buddies Framework (hereinafter "CAB Framework") illustrated at 107 and comprising a plurality of hardware and/or software components for executing with or on a central processing (CPU) component 108. The inventive system may be located on a local contact center server, at a remote location accessed via a network, or even on the agent's computer 105.

If the customer and agent are communicating by telephone, an automatic speech recognition system (not illustrated) will capture the speech (also referred to as a "speech record") and perform real-time speech transcription to produce a text transcript (also referred to as a "text record") of the interaction at Text Record Collector component 109. The speech transcription component may be integrated into the communication equipment being used by the agent, may be on the agent's computer, may be a stand-alone component between the agent's equipment and the CAB Framework, or may be part of the CAB Framework 107. If the customer-agent interaction is via e-mail, completion of a web form, web chat or other form of web posting, the text will be automatically extracted from the interaction and provided to the Text Record Collector component 109. The interaction may be a combination of speech and text input, in which case both speech transcription and text extraction will be performed.

It is also to be noted that an agent may be entering text or filling out a computer-displayed form on the contact center agent's computer 105 while interacting with the customer. The information about any entered text or form input will be recorded by the Feedback Collector component 114 and stored in the Feedback Storage component 115. Information about the current user context (e.g., application used, open window, input field with current focus, ID for the current interaction) may optionally be recorded in the User Context component 116. The entered text or form input to the agent's computer will also be provided to the Text Record Collector component 109.

The Iterative Call Control component 112 will periodically request the text record from the Text Record Collector 109 for the current interaction and decide if the current text record should be processed further by the system. If further processing is required, the Iterative Call Control component 112 passes the current text record to the Text Normalization component 111 which will create a normalized text record, herein referred to as an interaction log describing the current interaction that is created based on the current text record. The Text Normalization component passes the interaction log to the Issue Detection component 118 which will enrich the interaction log with detected issues and return resulting text, herein termed the enriched interaction log, to the Iterative Call Control. The enriched interaction log is then passed to the CAB Executor component 113. The CAB Executor component will invoke one or more Contact-center agent buddies (CABs) for tasks that are typically handled at the contact center to provide responses for assisting the agent in handling the identified issues. Details about when and how the decision for further processing is made are provided below with reference to FIG. 2.

The Iterative Call Control component 112 can send all or parts of the text record for the current interaction to the Text Normalization component 111. When dealing with speech, several types of speech artifacts, such as disfluencies (e.g., "um", "er"), corrections of speech (e.g., ". . . uhm no I meant . . . ", "I think that is an 8 or no a 9"), frequent speaker changes, artifacts created by the speech recognition system, and other errors introduced in the recognition process must be filtered out of the text by the Text Normalization component 111. Similarly for non-spoken input text, component 111 would perform filtering to eliminate and/or correct spelling errors, abbreviations, etc. Further details for the Text Normalization component 111 are provided below with reference to FIG. 3.

The Text Normalization component will pass the full or partial interaction log to the Issue Detection component 118.

The Issue Detection component uses dictionaries, grammars, rules, and models to detect the issues mentioned by the customer and/or contact-center agent during the interaction, creates a list of these detected issues and enriches the interaction log with it. For example, based on analysis of the interaction log, it may be determined that the customer is calling about a problem with a spam filter or perhaps is calling to place an order for a particular product. The enriched interaction log is passed to the Iterative Call Control.

If the Iterative Call Control component 112 decides to send the enriched interaction log to the CAB Executor component 113 as described above, the CAB Executor component will create possible responses to the issues listed in the enriched interaction log and transfer the possible responses to the Iterative Call Control component 112. Based on the list of possible responses, the Iterative Call Control may transfer one or more of the list of possible responses to the Presentation Generator component 119. Once the responses are transferred, those various results from the CABs may be analyzed and merged, classified or organized at the Presentation Generator component 119 for presentation to the agent, customer, or other targeted individual. In a preferred embodiment, a predefined number of responses can be defined, in which case the Presentation Generator component 119 will evaluate the responses, rank the responses, and present only the predefined number of top-ranked responses. The Presentation Generator component may in a preferred embodiment also use the feedback stored in Feedback Storage component 115, received from either the current interaction or from previous related interactions, plus information from User Context component 116 about the current application context to decide the right set of presentation responses and the right method to deliver these presentation responses. Details about how the Presentation Generator chooses and delivers responses are given in the description of FIG. 5.

The presentation to the agent may take the form of signaling the agent that information is available for agent selection or displaying information at a reserved screen area (e.g., displaying document fragments or links to available information) at the agent's computer display, or a combination of a plurality of presentation modes/artifacts based on responses from a plurality of CABs. The presentation can also take the form of a web page. The response can also include transferring information to other applications (e.g., the CRM system) as needed for further processing of the interaction and/or for documenting the interaction, as well as transferring information to additional agents (e.g., for handling by an automated support component or for escalation of requests).

Some examples of responses used by particular embodiments include, but are not limited to, the following:

Links to documents that are relevant to the customer interaction, which will typically be displayed as hyperlinks in a new or existing window on the agent's (or customer's) desktop and which can be selected by the agent to obtain support for handling the current customer request. In one embodiment the linked documents would be stored in an existing knowledge management database (not shown). The documents are determined using explicit rules created by a human or rules learned by observing which documents were used by humans (using manual search) in previous interactions containing similar issues. The documents can also be identified by doing an automated search in the knowledge management database using the text of identified issues as search terms.

Paragraphs from a document that is relevant to a call and which contain needed information. The document may be determined using explicit or learned rules (as above)

and a paragraph within a document can be identified using techniques similar to the ones used to identify passages in available query answering systems.

Structured information fields that can be transferred to an existing Customer Relationship Management (hereinafter, "CRM") system to document the ongoing interaction. Structured information may include product names, error messages, customer/product/serial number or similar items that have been captured from the interaction text stream and should be automatically transferred to the appropriate applications on the agent computer (where applicable). The CAB Framework will make the structured information available to external systems using either a push or a pull interface that can be adapted to the existing solution.

A form or template for agent entry of content to document the current interaction. An unstructured or semi-structured text is typically transferred to the CRM system once the agent opens a computer file with a form/template for documenting the interaction. Depending on the workflow, the text may be split into several records when the interaction is complex and involves multiple steps (e.g., a step of the agent proposing a solution and a step of a manager approving the solution) wherein each step must be separately documented. The CAB Framework may also automatically transfer a completed form to the CRM system. All data transfers are created as possible responses by the CAB, with the actual transfer to external systems being done by the Presentation Generator 119.

Dialogs for call guidance may be opened to alert the agent to specific procedures that have to be followed based on the interaction context (e.g., conversations that involve mention of an attorney or a law suit have to be transferred to the legal department) or that guide the agent through a series of questions to gather all the data needed for the current interaction. Responses given by the customer to these questions can be picked up by a CAB and automatically transferred to the system processing the data. The transfer can be done step-by-step (enabling the processing component to dynamically update the required information list) or in one step, (e.g. if the agent manually invokes an application consuming the collected responses).

A suggestion of alternative targets for transferring the interaction, for example to a different department or to a manager. The suggestion response may be displayed as a "hint" on the agent's computer screen (e.g., "this call needs to be handled by the legal department" or "this call is appropriate for transfer to a supervisor") or as hints automatically send to the agent's supervisor (e.g., "Agent X has a very aggressive customer and supervisory intervention is recommended").

Decision support information, such as "deny support request since the customer's warranty period has run out" may be generated for display to an agent. The decision support information may be displayed as "hints" on the agent's computer screen and may additionally include a link to a document that spells out the governing policy (e.g., link to a copy of the product service guidelines or warranty provisions). The decision support information may also include a request for additional information that the contact-center agent should enter, if known, or ask the customer to provide. The information will then either be picked up as feedback or by extracting it from the customer's answer in a future iteration done on the current interaction.

Cross-sell or up-sell opportunities are identified and displayed to the agent. These opportunities are detected based on information in the CRM system (e.g., all of the products bought by the customer in the past) and the ongoing interaction (e.g., an update for a product the customer calls about or a new product that can fulfill a need that the customer expresses). This process will be described below with reference to FIG. 7.

The presentation, which is output from the Presentation Generator 119 for display to the agent, may additionally or alternatively include a request for feedback or for additional information from the agent when input is needed for a CAB or other decision support system to generate a further response. Agent feedback may relate to the support offered in the presentation (e.g., input that a link is not useful and should not be displayed again during the current interaction) or may be additional information needed by a CAB or CABs (e.g., input for decision support) or agent input to guide further processing by a CAB or CABs (e.g., signaling that the previous part of the interaction was relevant that that the CAB or CABs should focus on that part of the interaction to generate additional support). Other agent actions may generate implicit feedback for the CAB Framework to collect with Feedback Collector component 114 and store in the Feedback Storage component 115. If the agent enters information about the interaction topic, for example into a CRM system, the CAB Framework can use that feedback to focus on issues related to the interaction topic (e.g., the customer's product). Agent entry of the issue/topic enables the CAB Framework to ignore issues mentioned in irrelevant portions of the interaction, (e.g., talk about other products used by the customer or small talk which is used to bridge waiting time). Non-feedback (e.g., not using a document offered) can also be used as tentative negative feedback unless other circumstances (e.g., knowing the agent read a document multiple times in the past and hence may be familiar with it) are present. As further detailed below, with reference to the process flow of FIG. 8, the feedback may result in iterative processing by one or more of the CABs. Feedback can be used to generate usefulness scores for the various responses. Storing the feedback and/or the usefulness scores allows the CABs to use the feedback and/or scores when generating future responses for the present interaction or a future interaction. Feedback may also originate from the customer and be transferred to the system (e.g., if the agent 103 is an automated self-service agent). In that context the customer is also the originator of explicit or implicit feedback like document use or non-use.

Feedback processing is done at the Feedback Collector component 114 as will be further detailed below with reference to FIG. 5.

Figure 2:
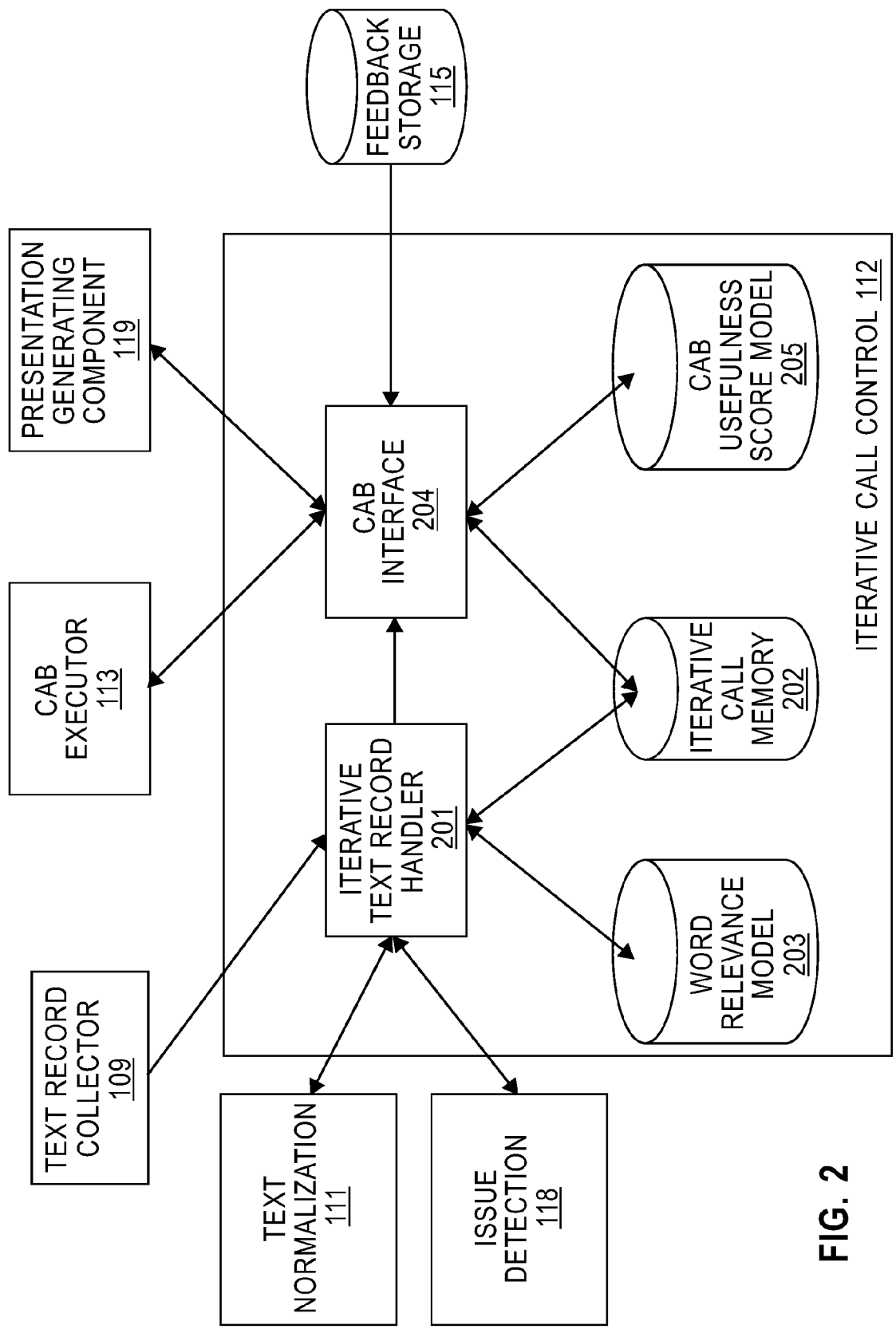
FIG. 2 is a block diagram illustrating representative sub-components for the Iterative Call Control component in accordance with the present invention.

FIG. 2 describes the iterative processing of interactions in the Iterative Call Control component 112. The text records for the interaction are made available by the Text Record Collector 109 before they are processed by the Iterative Text Record Handler 201. The transfer from component 109 to component 201 can be initiated either by component 109 as a push, whenever new parts are available in the text record, or by component 201 on a fixed time basis or based on a round robin scheme through which multiple interactions are processed in parallel.

After either an incremental or full update of the text record, the Iterative Text Record Handler 201 uses the Iterative Call Memory 202 to decide which parts of the text record changed between the last processing of the text record for this interaction and the current version. In most cases, the difference will be that words are appended at the end. The Iterative Text Record Handler then uses the Word Relevance Model 203 to decide if the words involved in the differences are likely to produce new responses for the current interactions. In a preferred embodiment, the Word Relevance Model is built by using statistical analysis of a large number of iterative runs done by component 112 and by comparing the analysis results to determine which word changes are the most likely to cause different analysis if added to an interaction. The relevance model may be initialized with a unique relevance for all words causing a text record processing change. The foregoing initialization will initially cause high loads but will ensure that no issues are missed. Depending on overall load considerations, in another embodiment the model can then be trained and fine-tuned to balance processing power needed and responsiveness of the system.

The Iterative Text Record Handler 201 can either send the full text record or a partial text record to Text Normalization 111 which will create a full or partial interaction log and send it to the Issue Detection components 118. If a partial record is sent, component 201 will merge the partial enriched interaction log from component 118 with the enriched interaction logs from previous iterations for this interaction stored in the Iterative Call Memory 202 by using previously generated links between the detected issues stored in the enriched interaction log and the corresponding position in the text record. These links allow replacement of issues with updated versions for parts of the text record that were re-processed in the current iteration. The Iterative Text Record Handler selects the text record parts to be processed based on current overall system load (i.e., more parallel interactions will favor more partial processing), pauses in the interaction (e.g., longer pauses make it more likely that parts are independent), information about holds and transfers (which typically mean the interaction parts before and after the point where a customer is placed on hold or is transferred to another agent can be handled separately), and detected topic shifts (i.e., changes from one issue to another again suggest independence of interaction parts). After creating a merged version of the enriched interaction log for the complete interaction, the interaction log is transferred to the CAB Interface component 204. The CAB Interface component decides if any of the issues in the enriched interaction log are likely to be handled by one or more of the available CABs. This decision is made based on the CAB Usefulness Score Model component 205. The CAB Usefulness Score Model is created based on the evaluation of feedback about CAB success relative to the detected issues. The model can be initialized assuming every CAB can deliver useful responses for every issue. As the component 205 is updated based on positive or negative feedback to previous responses, the processing requirements for interaction processing will go down, since CABs will only be called for issues on which they can provide useful responses. Once the CAB Interface 204 decides which CABs should be called, the CAB Interface 204 passes the enriched interaction log and the list of CABs to be called to the CAB Executor 113 which will execute the request. Details about the CAB Executor 113 are given in the description of FIG. 4. After requests are processed by the various CABs and returned to component 204 by component 113, the CAB Interface component 204 passes the enriched interaction log, together with the returned responses, to the Presentation Generator 119 that will use them for further interaction with the contact-center agent. Component 204 also updates the CAB Usefulness Score Model 205 based on feedback given on responses from earlier iterations stored in the Feedback Storage 115.

Figure 3:
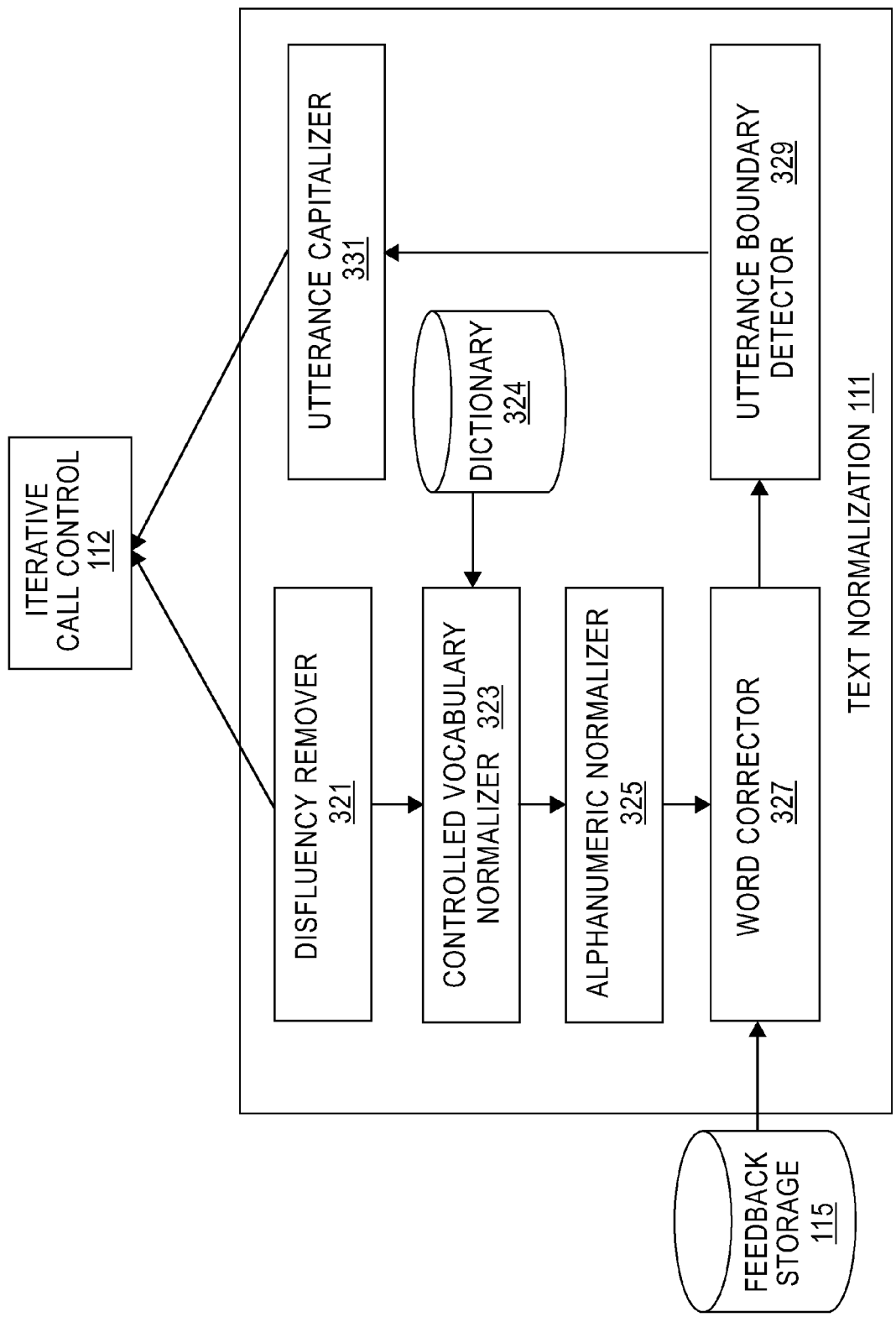
FIG. 3 is a block diagram illustrating representative sub-components for the Text Normalization component in accordance with the present invention.

FIG. 3 illustrates the process flow implemented by the Text Normalization component 111. The text record is sent by the Iterative Call Control component 112 in FIG. 1 as input to the text normalization process. Its goal is to convert the text record, which in the case of a transcribe phone call typically consists of a string of word/time pairs all in upper case with no punctuation or sentence boundaries, into something resembling normal written text, both for ease of display to the agent and to enable more accurate analysis in subsequent steps. The text normalization can consist of many different types of processing; in a preferred embodiment, it begins at Disfluency Remover 321. Component 321 removes disfluencies such as "um" or "er" that are found in the recognized speech. A Controlled Vocabulary Normalizer component 323 replaces recognized domain terms, such as proper names, with their capitalized forms with reference to Dictionary 324. An AlphaNumeric Normalizer 325 replaces groups of number words with digits, groups of letter names with acronyms, and groups of number and letter words with alphanumeric strings (e.g., "nine one one" becomes "911", and "I B M" becomes "IBM"). The Word Corrector 327 corrects incorrectly recognized words in the call transcript based on the agents' feedback stored in Feedback Storage 115. In a preferred embodiment, the word corrections made by the agents are captured by the Feedback Collector component 114. The word correction feedback contains the incorrectly-recognized word, the correct word, and the context (typically a several-word snippet of text) the incorrectly-recognized word appears in. The Word Corrector replaces all other occurrences of the incorrectly-recognized words with the correct words in the rest of the call transcript if the contexts are the same or very similar. The Utterance Boundary Detector 329 determines utterance boundaries (where utterances are units of speech by a single speaker, bounded by silences) and adds periods to the ends of utterances. One embodiment of the utterance boundary detection is described in a related application "System and method for automatic call segmentation at call center" (Ser. No. 12/257,037 filed Oct. 23, 2008). The Utterance Capitalizer 331 capitalizes the first word in each utterance. Algorithms for performing utterance capitalization are well known to those skilled in the art of text analytics. It will be understood that certain aspects of the text normalization can be done out of the sequence shown without adversely affecting the output. A processed text record, herein referred to as the interaction log, is transferred by the Text Normalization component 111 to the Issue Detection component 118 in FIG. 1.

Figure 4:
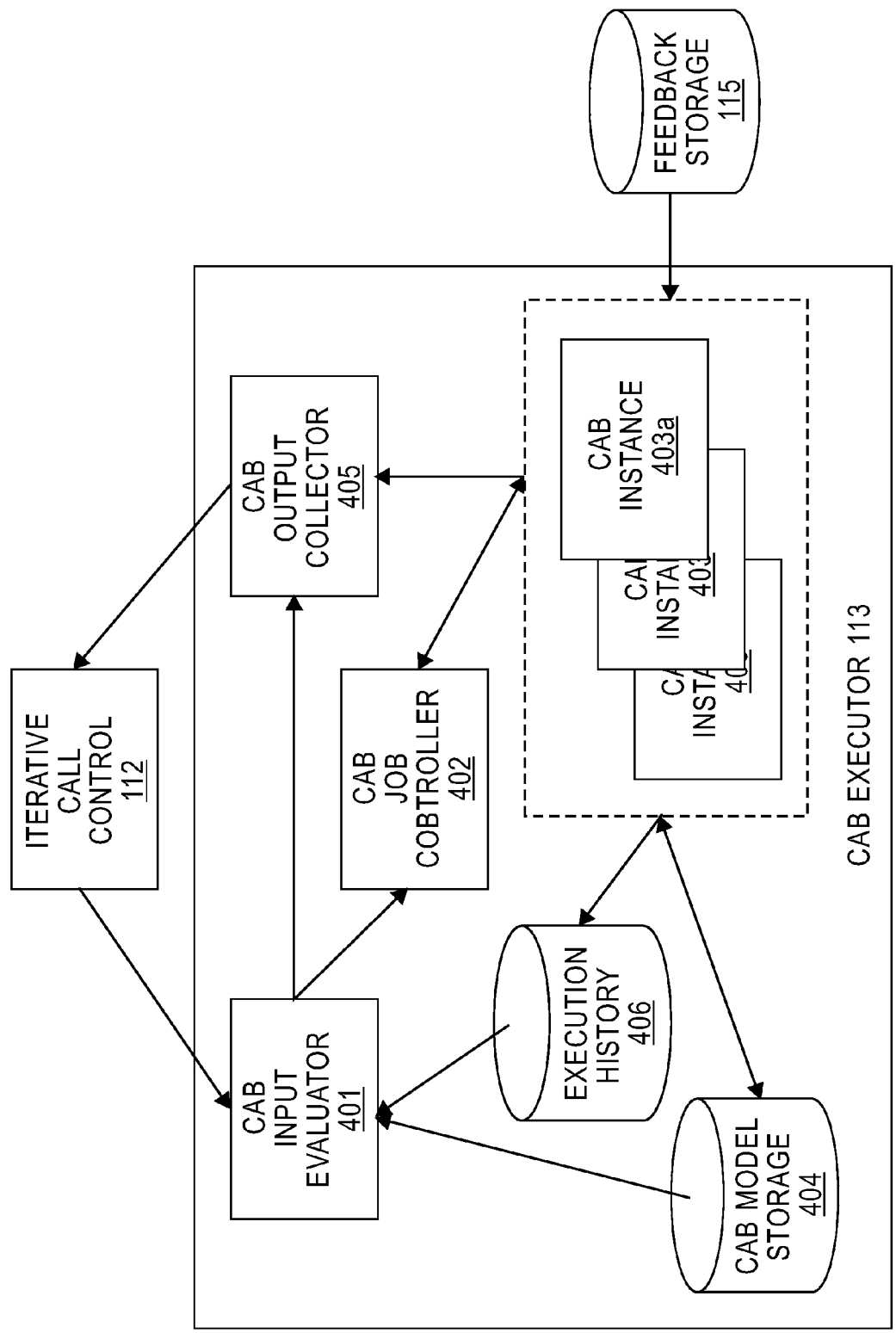
FIG. 4 is a block diagram illustrating representative sub-components for the Cab Executor component in accordance with the present invention.

FIG. 4 describes the details of the CAB Executor component 113. The CAB Executor contains all of the individual CABs that are available in the system. The invention covers various types of CABs that can be realized using existing technologies and can easily be extended with new types that will be appropriate for specific contexts.

The enriched interaction log and the list of CABs to call are transferred from the Iterative Call Control component 112 to the CAB Input Evaluator component 401. The Cab Input Evaluator will evaluate, for every CAB in the CAB list passed into component 401, if the parts of the enriched interaction log that are relevant for the CAB, i.e. that are used by the CAB for it's calculations, are different from the relevant parts that were present at the previous iteration on this call by evaluating the Execution History component 406 and the CAB Model Storage component 404. If these relevant parts are different for a given CAB, it sends a CAB call task (i.e., a request to invoke one or more CABs) to the CAB Job Controller component 402. It also sends the information about the initiated CAB call to the CAB Output Collector component 405. If the enriched interaction log does not have a relevant change that is relevant for given CAB, the CAB Input Evaluator will also transfer the previous iteration's responses from the Execution History to the CAB Output Collector component 405. In those cases where a CAB call task is generated, the CAB Job Controller 402 will transfer the call task containing the interaction log and detected issues to an appropriate one or more of the CAB Instances 403a to 403n. Each CAB type may have multiple CAB Instances to optimize overall system throughput and latency. The CAB Job Controller 402 is responsible for implementing the correct scheduling of tasks to the CAB Instances. Each called CAB Instance 403 reports the created responses to the CAB Output Collector component 405 and to the Execution History component 406. The CABs may also update the CAB Model Storage component 404 based on their individual processing. The CAB Output Collector component 405 waits until either all CAB responses are present (e.g., by being sent to component 405 based on the results of a previous iteration from the CAB Input Evaluator component 401 or from a CAB Instance component 403) or until a defined time has passed. After either event has occurred, the CAB Output Collector component 405 transfers all obtained responses to the Iterative Call Control component 112.

Figure 5:
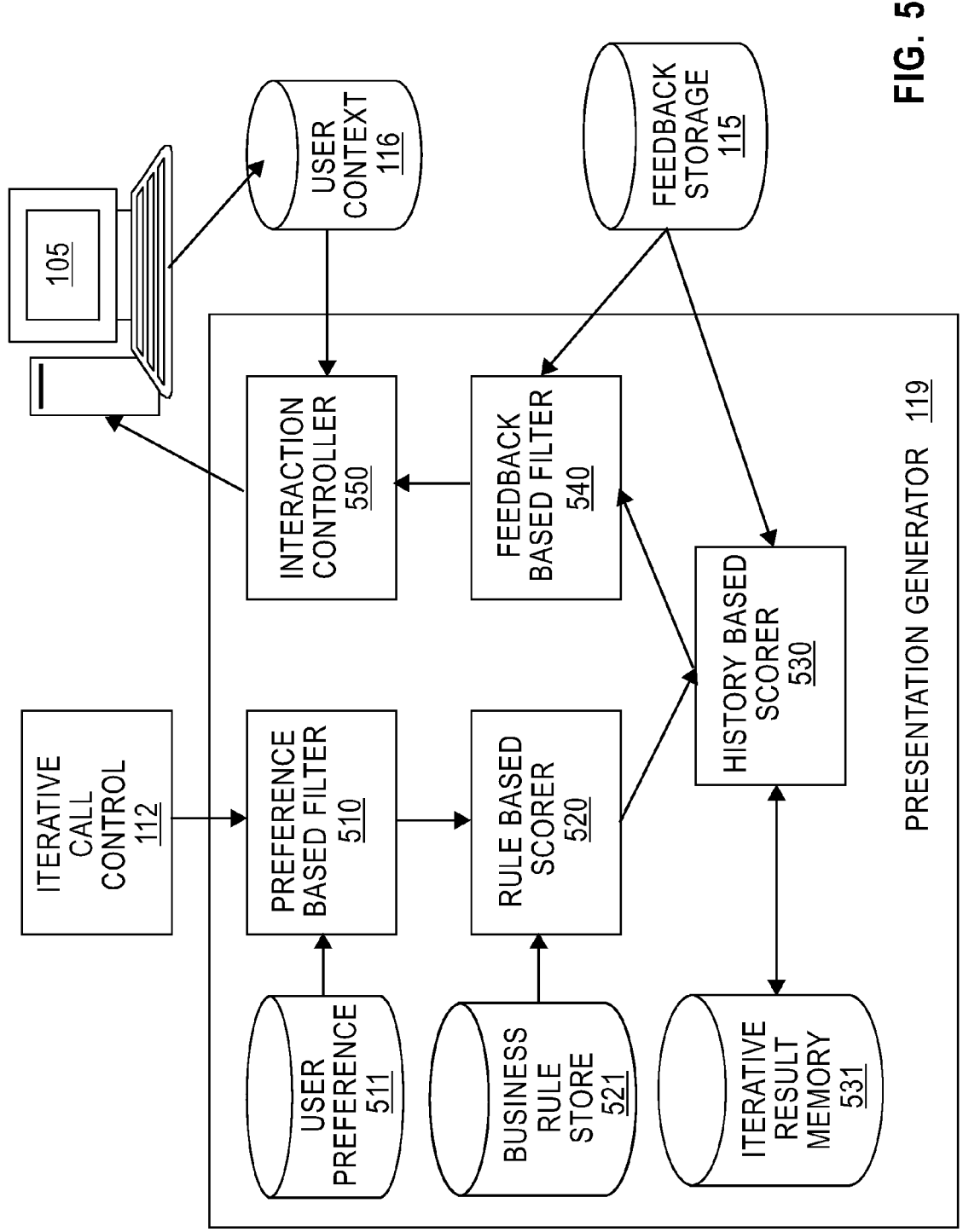
FIG. 5 is a block diagram illustrating representative sub-components for the Presentation Generator component in accordance with the present invention.

FIG. 5 describes the details of the Presentation Generator 119. The Presentation Generator receives the enriched interaction log, the identified issues, and possible responses created by CABs; it then interacts with the contact-center agent's computer 105 in order to provide results for the agent in a plurality of ways. The Iterative Call Control component 112 transfers the enriched interaction log and possible responses to the Preference Based Filter component 510. The Preference Based Filter uses available user settings stored in the User Preference component 511 to exclude or prefer responses based on the agent's preferences, (e.g. based on the response type or response technical experience level). After the preference filtering step, the responses are scored by a Rule Based Scorer component 520 that uses rules stored in the Business Rule Store component 521 to assign a score to each result. The scoring can be used, for example, to rank results according to the agent's department or agent's experience level. After the scoring, the results are passed to the History Based Scorer component 530 that uses the contents of the Iterative Result Memory component 531 and the Feedback Storage component 115 to modify the score based on implicit and explicit feedback. The History Based Scorer component 530 increases the score generated by the Rule Based Scorer 520 for responses that received positive feedback for interactions with similar issues in the past and decreases the score generated by the Rule Based Scorer for responses that received negative feedback in the past. The weight for the increase or decrease is modified by the similarity of the profile (e.g., department, experience level, specialties, etc.) of the current agent and the agent that provided the feedback. The feedback for responses similar to the examined (e.g., based on products mentioned, type, length, etc.) is also used with a reduced weight. The History Based Scorer 530 will also increase the weight of responses not provided previously in the interaction and will decrease the score of responses offered several times but never accepted (as indicated by having no feedback). After this score adjustment, the responses and their current weights are passed on to the Feedback Based Filter component 540 that will use the Feedback Storage 115 to filter out any result that received negative feedback in a previous iteration for the current interaction. It is to be noted that the History Based Scorer can generate its own scores, rather than modifying the scores generated by the Rules Based Scorer, and the two sets of scores can then be combined for each response. The agent's computer needs to provide an interface for the agent to invalidate previous negative (or positive) feedback to be able to reset this re-scoring and filtering.

After the final filtering step the responses are passed on to the Interaction Controller component 550. The Interaction Controller uses the current user context (e.g. the current application) to decide the most appropriate method of presentation of the results. The context is used to decide if the agent can be disturbed (e.g. with a popup window) or if the agent is currently entering information and should only get an indicator so that he can review the responses when it's convenient for him. The Interaction Controller can also transfer information to other components running in the contact center (component 117 in FIG. 1) as needed for further processing of the interaction and/or for documenting the interaction. The other component could be, but is not limited to, one or more of a CRM system and communication equipment that can be used to transferring information to additional agents (e.g., for handling by an automated support component or for an indication of a recommended escalation of interactions to supervisors or specialists, including initiating a transfer of the interaction to said supervisor or specialist). The information transfer will again be executed based on the current user context (e.g., the current interaction identifier from the CRM system) and will be synchronized with the appropriate instance of component 117 to transfer the information. The Presentation Generator component can also provide the responses for the interaction upon receipt of a request from an external system (pull-model). The delivery of responses can also be customized according to the individual contact center environment.

In addition to responses to display, the Interaction Controller 550 may also present the detected issues to the agent. The agent may then give feedback to these issues to indicate mistakes made during the issue detection or he may indicate issues to focus on for the remainder of the call. The CAB Framework may use this feedback to optimize the output for the next iteration for this interaction log.

A presentation to the agent may take the form of signaling the agent that information is available for agent selection or displaying information at a reserved screen area (e.g., display document fragments or links to available information) at the agent's computer display, or a combination of a plurality of presentation modes/artifacts based on responses from a plurality of CABs. The presentation can also take the form of a web page.

Figure 6:
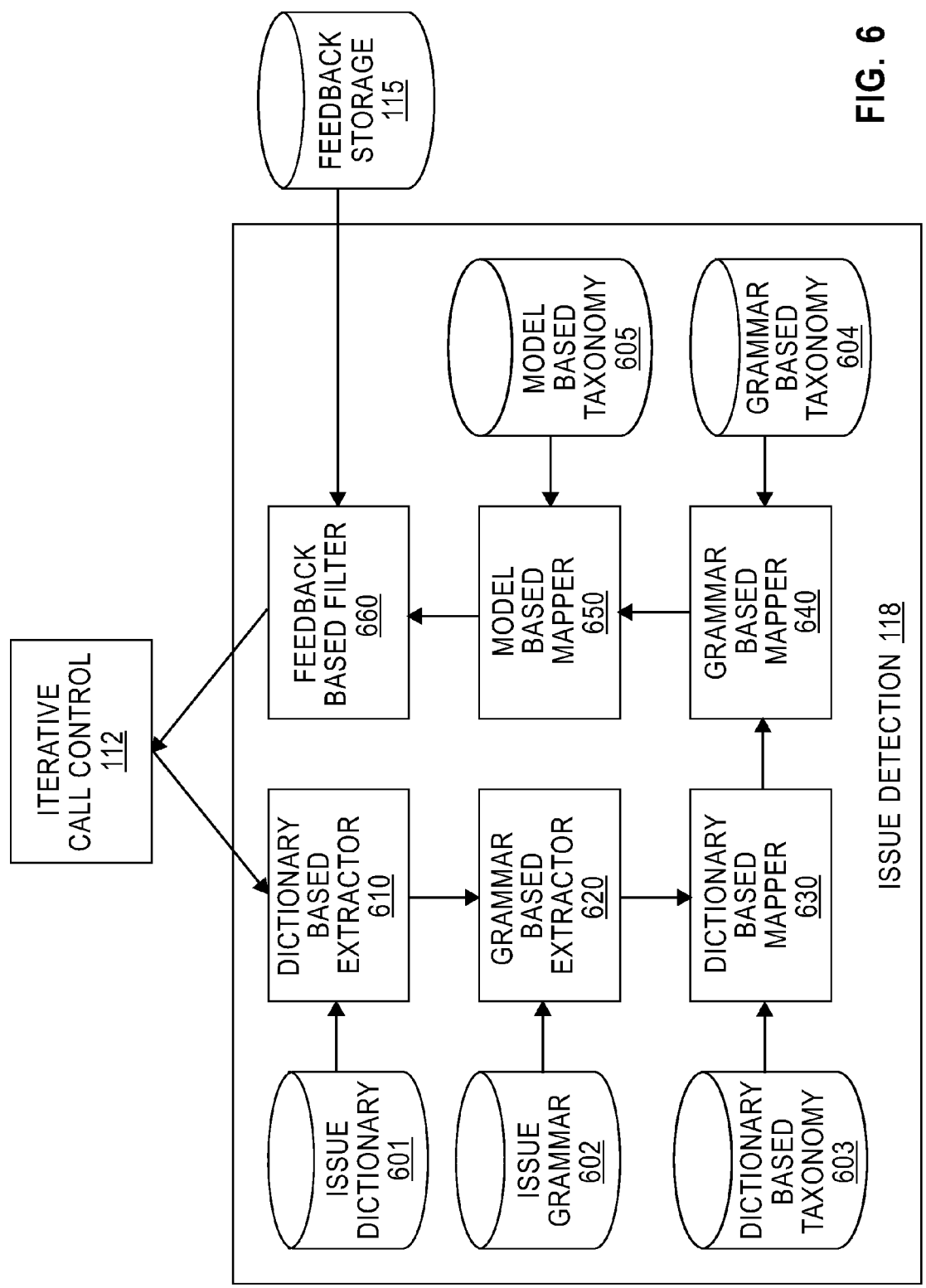
FIG. 6 is a block diagram illustrating representative sub-components for the Issue Detector component in accordance with the present invention.

FIG. 6 describes details about the Issue Detection component 118. The issue detection uses multiple technologies to detect relevant issues in the full or partial interaction log for the agent-customer interaction. The order of the component calls is based on increasing complexity, but multiple invocation orders can easily be imagined. The interaction log is transferred from the Text Normalization component 111 to the Dictionary Based Extractor 610. The dictionary base extractor will mark up relevant terms listed in the issue dictionary contained in the Issue Dictionary component 601 (e.g., product and component names, typical actions like "buy" or "install"). The markup may add additional features like type (e.g., product, component, action), part of speech (e.g., noun, verb) or other information that can be stored in the dictionary. These marked up words will also be transferred into the issue list. The issue dictionary may either be manually created or inferred from a large document corpus. For example, product name variations can automatically be extracted from a large sample of interaction logs. The Grammar Based Extractor 620 will then process the interaction log and mark up relevant passages that are recognized by grammars found in the Issue Grammar component 602. These passages include but are not limited to:

- Phrases describing products or components that can not be expressed using dictionaries (e.g., complex variations of products like sizes or colors),
- Phrases typically describing problems (e.g., "I have a problem with . . . ", " . . . does not work", "I have trouble . . . ", "I get a . . . message"),
- Phrases typically expressing actions (e.g., "I just installed . . . ", "I just bought . . . ", "I just received a letter . . . "),
- Phrases typically expressing goals or needs (e.g., "I want to . . . ", "I need to . . . ", "I have to),
- Phrases typically used during transfers (e.g., "I have Mr. . . . on the line", "I have a customer that needs . . . ")

These phrases may either indicate the issue itself, like the complex product name, or they may indicate the position of the issue, like phrases that precede an issue. The grammar expressions can be used to indicate where the issue is to be found. The grammars may involve additional features for words that are included in the matched expression, like part of speech, or type (e.g., the word is part of a product name), and they also may use sentence structure (e.g. for match range restrictions). Grammars may also set additional features in the markup that can be used by later running components. After the issues are marked up, they are added to the detected issue list.

The next component is the Dictionary Based Mapper 630, which uses a Dictionary Based Taxonomy component 603 to identify issues from a taxonomy of predefined issues. This component will not mark up individual issues in the interaction log, but instead uses one or more words in the interaction log to identify one or more nodes from the taxonomy and mark up the interaction log as related to these nodes. In addition to this markup, the nodes are also added as issues to the issue list. This component may use markups or features of markups created by other components. The mapping from words to taxonomy nodes can be manually created or semi-automatically extracted by analyzing a large number of interaction logs and their documentation in a CRM system.

The next component is the Grammar Based Mapper 640 that uses a Grammar Based Taxonomy 604 to identify one or more passages in the interaction log and uses these to identify one or more issues from a issue taxonomy. This component will not markup individual passages, instead it uses one or more passages found in the interaction log to identify one or more nodes from the taxonomy and mark up the interaction log as related to these nodes. In addition to this markup, the nodes are also added as issues to the issue list. This component may use markups or features of markups created by earlier running components. The mapping from passages to taxonomy nodes can be manually created or semi-automatically extracted by analyzing a large number of interaction logs and their documentation in a CRM system.

The next component is the Model Based Mapper 650 that uses a Model Based Taxonomy 605 to identify one or more nodes from the taxonomy and mark up the interaction log as related to these nodes. In addition to this markup the nodes are also added as issues to the issue list. This component may use words, markups or features of markups created by earlier running components. It may also use specific rules to extract features that can be customized in the Model Based Taxonomy. The mapping from passages to taxonomy nodes is automatically extracted using machine learning by analyzing a large number of interaction logs and their documentation in a CRM system.

The final component of the Issue Detection component 118 is a Feedback Based Filter 660 that uses the Feedback Storage 115 to detect which issues were explicitly ruled out by the contact-center agent for this interaction. The filtered issues are removed from the current list of issues and the enriched interaction log is created from the issue list and the received interaction log. The enriched interaction log is passed back to the Iterative Call Control 112. The Iterative Call Control merges the enriched interaction log with enriched interaction logs from previous iterations if the interaction log transferred to the Text Normalization component 111 was partial.

Figure 7:
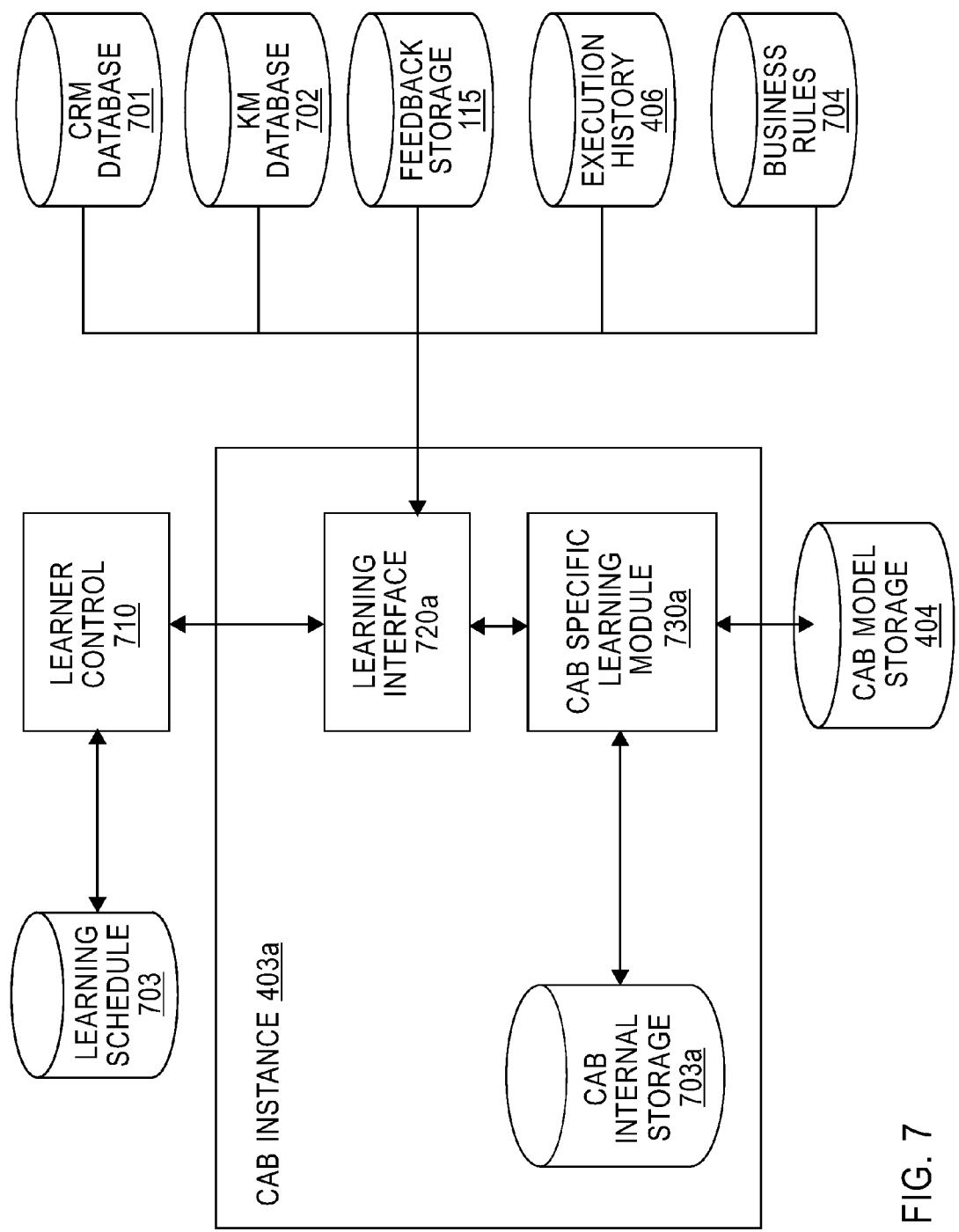
FIG. 7 is a block diagram illustrating representative sub-components for the CAB Instance component in accordance with the present invention.

FIG. 7 describes details of the feedback and learning process that is available for every CAB if needed by that specific CAB. As an example the CAB Instance 403*a* (introduced in FIG. 4) is assumed to need to learn based on feedback and or environment changes. The Learner Control component 710 is configured to know about the learning needs of CAB Instance 403*a* that are stored in the Learning Schedule 703. It is assumed that the learning has only to be done once across all instances of a CAB type; the Learning Control will signal other instances of a CAB about a learning cycle that has been done by the first instance. The CAB Instance 403*a* implements the Learning Interface 720*a* that gets signaled by the Learner Control 710 to start the next learning iteration. The Learner Control uses information about changes in the Knowledge Management Database (KM Database) 702 and the CRM Database 701, changes in the Feedback Storage 115, the number of interaction logs processed, the system load, the current time and the time since the last learning iteration was invoked for CAB Instance 403*a* as stored in the Learning Schedule 703 to decide the time when a learning iteration is invoked. When the next learning iteration is started the Learning Interface 720*a* will contact the CAB Specific Learning Module 730*a* to start the learning process. The details for the CAB Specific Learning Module are specific to a particular CAB type and this description is only one of several possible implementations. The Learning Interface 720*a* will contact the various data resources available in the contact center—including but not limited to the CRM Database 701, the KM Database 702, the Feedback Storage 115, the Execution History 406, and Business Rules 704 that contain information about products—their relationships and sales strategies around the products that can be used for cross-sell and up-sell strategies, for example—and provide the information as needed by the CAB Specific Learning Module 730*a*. The CAB Specific Learning Module can also contact the CAB Model Storage 404 to retrieve information stored by previous executions of the particular CAB Instance. The CAB Specific Learning Module may also use additional CAB Internal Storage 703*a* for its processing. The CAB Specific Learning Module will then update the CAB Model Storage 404 with the updated model that the CAB Instance 403*a* will use to process interaction logs in the future. The CAB Specific Learning Module may also update the CAB Internal Storage 703*a* for reference in further processing. All changes to the model used by the CAB for further interaction log processing that might be shared with other instances of the same CAB type are assumed to be in CAB Model Storage 404. Data that will only be needed by this instance, like cached calculations for the next learning iteration, are assumed to be stored in the CAB Internal Storage 703*a*. After the learning iteration is finished, the Learning Interface 720*a* will inform the Learner Control 710 about the successful completion of the learning cycle. The Learner Control can then inform additional instances of the current CAB type about the updated model in the CAB Model Storage 404 so that the additional instances can update to the latest model and do additional adjustments as needed.

Figure 8:
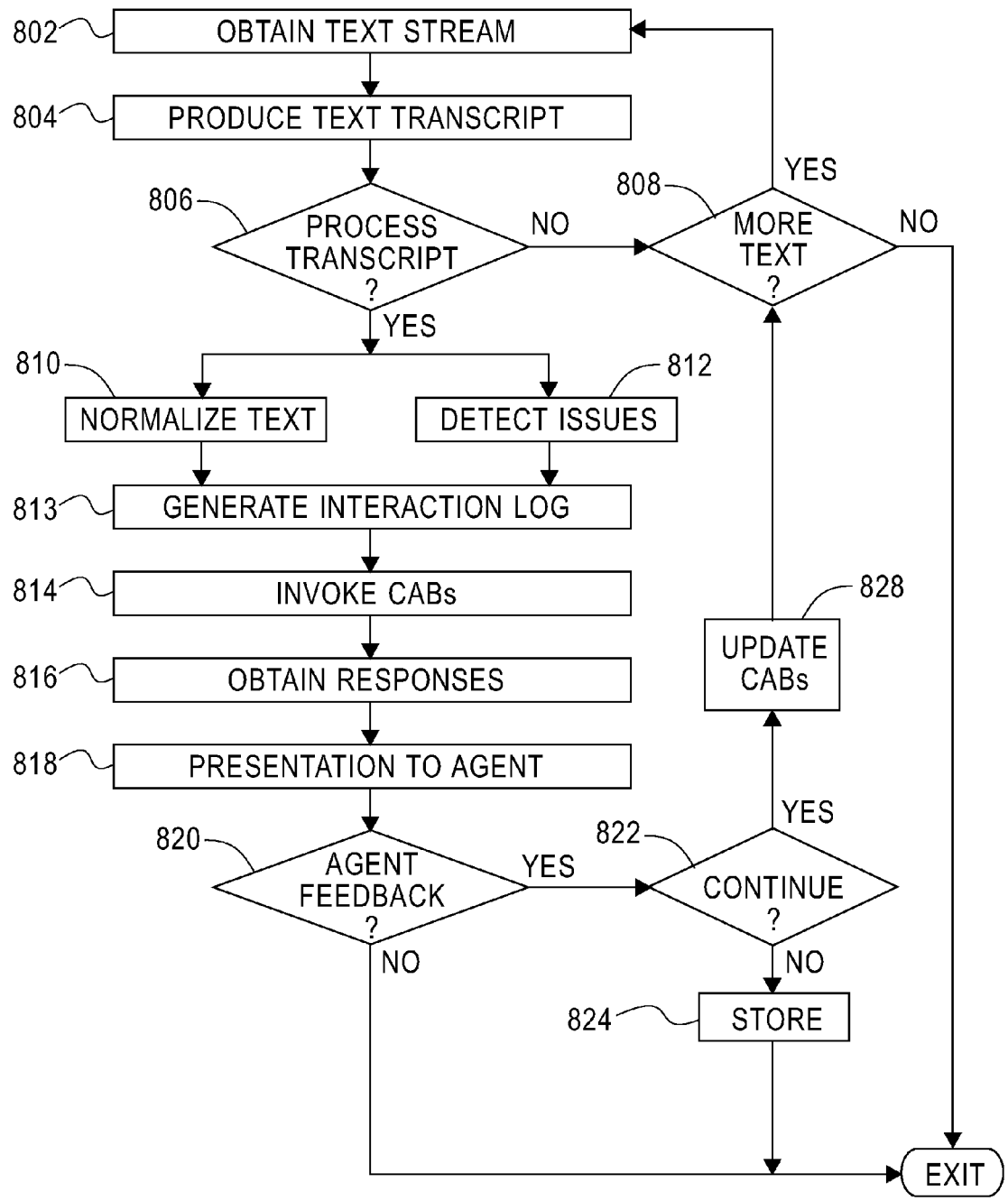
FIG. 8 is a basic process flow for implementing the present invention.

FIG. 8 illustrates a process flow for implementing the present invention. At step 802, the system obtains the text stream. As detailed above, the text stream may be obtained from a speech recognition system, a handwriting recognition system, extraction from e-mails, web postings or chat flows, etc. At step 803, a text transcript is produced. At step 806, the system determines whether or not to process the text transcript (for example, it may decide that the text has changed very little since a previous processing and therefore it does not need to process the new text). If the decision is made to process the transcript, part of or the entire text transcript is sent for text normalization at step 810 and then for issue detection at step 812. Text normalization in step 810 includes filtering from the text potential error sources, such as the aforementioned disfluencies, misspelling, etc. During step 812, the text is analyzed to identify text related to contact center tasks. With the return information from text normalization and issue detection, the Iterative Call Control generates an interaction log for provision to the CAB Executor at step 813. One or more CABs will be invoked at step 814 and the resulting responses provided by the various CABs will be combined into a presentation at step 816; further detailed below. As discussed above, the CAB Executor may make a determination (not shown) as to whether any CAB should be invoked based on the results of previous iterations. At step 818, a presentation is displayed to the agent, in one or more of the ways described above. At step 820, the system/method determines if the agent has provided any feedback based on the presentation of responses. Feedback is stored at step 824. At step 822, the system/method determines whether the feedback is relevant to one or more of the CABs. If further processing is required based on the feedback, the CABs may be updated at step 828 and the system returns to step 808 to determine if a new text transcript version is available for processing. If the decision is made at step 806 not to process the transcript, step 808 is similarly invoked to see if further text is now available.

As described above, in step 814 a plurality of CABS may be invoked. These CABs may implement a wide variety of processes, each producing its own response and the responses are combined into a presentation to the agent in step 816. In a preferred embodiment, one of said plurality of CABs rates potential answers to a customer query based on which answers received the most frequent positive feedback from the agent in previous customer interactions (i.e., the response from this CAB is a ranked set of potential answers to the customer's question). Similarly, another CAB provides responses containing links to documents that contain information relevant to said customer interaction. Yet another CAB provides responses containing pairs comprised of labels and words from the enriched interaction record (e.g, "vehicle purchase year, 2006"). Yet another CAB can provide responses containing contact information of other contact-center agents capable of handling the current customer interaction based on their expertise or role. A CAB may generate responses with an estimate of current customer satisfaction. Still another CAB may provide responses containing the result(s) of the invocation of a decision support system that automatically generates a solution to the identified task/customer problem.

Responses created in step 814 may take many different forms, including, but not limited to, signaling to the agent that at least one new response is available and presenting the response on request; immediately displaying a response in a window in the screen; transferring a response to one or more external systems; storing responses; alerting another contact-center about one or more response; and requesting additional information from the customer or agent if a need is indicated by the response. Stored responses can be made available for external systems to access.

At step 816 the responses are merged, classified, and organized, as needed, to produce a presentation of one or more artifacts for display to the user. The system may limit the number of responses sent to an agent and may order responses whereby only the most useful responses will be shown to the agent. A CAB or other analytic component may analyze generated responses and assign usefulness scores to the generated responses, after which only the "most useful" responses will be selected at step 816 for presentation to the agent. Usefulness scores may be stored to a database of scores and that database of scores may be used to filter responses by invoking at least one of a plurality of components. The filtering may apply rules such as, but not limited to, the following: to prefer results that received high scores on the customer issues in previous customer interactions; prefer results that received high scores on the customer issues in earlier invocations of the steps in the current customer interaction; avoid results that received low scores on the customer issues in previous customer interactions; and avoid results that received low scores on the customer issues in earlier invocations of the steps in the current customer interaction.

The presentation input is sent for display to the agent at step 818. Step 819 then checks for agent feedback to the information presented in step 818; optionally, if the agent is a computer agent (e.g., in a self-service system), the feedback checked is actually just customer feedback passed via the computerized agent. Step 820 determines if there is any agent feedback. If there is no agent feedback, the system determines in step 808 if more text is forthcoming. While the process flow shows the "more text" determination being made at step 808, it should be understood that this step, as well as other steps such as on-going text analysis, task classification and CAB processing can be conducted in a different order than that described here, or in parallel throughout the duration of a customer-agent interaction.

In those cases when agent feedback is obtained (i.e., when the answer to step 820 is "yes"), the system stores the feedback at step 822, and then determines whether the agent feedback is relevant to further CAB processing in step 824.

Relevant feedback can be used in a variety of ways. For example, when the feedback is useful in reclassifying a task or invoking a CAB, either iteratively or anew, the system returns to the appropriate step in the process flow, makes the appropriate modification to the CAB response, and continues. Feedback to a response may be also be used to invoke at least one of a plurality of components to provide more information to a decision support system and/or to determine a usefulness score of the one or more response for the current interaction. It is to be noted that feedback may come from an agent, the customer or another contact center agent that may have received the at least one response.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be loaded onto a computer or other programmable data processing apparatus to cause a series of operational steps to be performed on the computer or other programmable apparatus to produce a computer implemented process such that the instructions, when executed on the computer or other programmable apparatus, provide processes for implementing the functions/acts specified in the flowchart and/or block diagram block or blocks.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O" or "user interface" as used herein is intended to include, for example, one or more input devices (e.g., keyboard, mouse, touch screen, etc.) for entering data to the processor, and/or one or more output devices (e.g., printer, monitor, etc.) for presenting the results associated with the processor.

Accordingly, an application program, or software components thereof, including instructions or code for performing the methodologies of the invention, as heretofore described, may be stored in one or more of the associated storage media (e.g., ROM, fixed or removable storage) and, when ready to be utilized, loaded in whole or in part (e.g., into RAM) and executed by the processor 108. In any case, it is to be appreciated that at least a portion of the components shown in the above figures may be implemented in various forms of hardware, software, or combinations thereof. Given the teachings of the invention provided herein, one of ordinary skill in the art will be able to contemplate other implementations of the components of the invention.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

The invention claimed is:

1. A method for a computer system having at least one processor for automatically creating responses in real-time during a interaction between a contact center customer and a contact center agent at a contact center comprising the steps of the computer system:

a) obtaining a speech record of a conversation between said customer and said agent;

b) transforming said speech record to a text record with a speech transcription system;

c) analyzing said text record to identify one or more customer issues from said text record and to determine whether the one or more customer issues require handling by one or more of at least one decision-proposing component based on the analyzing, to generate an enriched text record comprising the text record with identified issues, and to send the enriched text record to one or more of at least one response generating component;

d) said at least one decision-proposing component generating one or more responses per identified customer issue; and e) outputting said one or more responses to said contact center agent for agent use in interacting with the customer.

2. The method of claim 1 further comprising of a step of receiving feedback about said responses from at least one of said contact center agent, said customer, and other contact-center personnel, processing the feedback and sending the feedback for analyzing as part of the text record.

3. The method of claim 2 further comprising of a step of storing said feedback in a feedback database.

4. The method of claim 1 further comprising repeating steps b) through e) for a subsequent speech record in said customer interaction.

5. The method of claim 1 wherein said obtaining a speech record comprises at least one of real-time capture of on-going speech and retrieving prerecorded speech.

6. The method of claim 1 further comprising a step of preparing said text record for analysis comprising at least one normalization step of:
   removing disfluencies from the said text record;
   normalizing vocabulary in said text record;
   normalizing alphanumeric characters in said text record;
   detecting sentence boundaries in said text record;
   adding punctuation marks at said sentence boundaries;
   capitalizing letters in said sentences; and
   detecting call segment boundaries to generate an interaction log and wherein the analyzing step generates an enriched interaction log comprising the interaction log and identified issues.

7. The method of claim 3 further comprising filtering said text record based on said feedback stored in said feedback database.

8. The method of claim 1 wherein said contact center agent is one of a human working in a contact center or a computer-based agent in a contact-center self-service system.

9. The method of Claim 6 wherein said responses are generated by invoking at least one of a plurality of decision-proposing components for processing the enriched interaction log.

10. The method of claim 9 further comprising filtering said enriched interaction log based on said feedback stored in said feedback database and wherein said responses are generated by said at least one of a plurality of decision-proposing components processing the filtered enriched interaction log.

11. The method of claim 1 wherein said outputting comprises at least one of:
   signaling to the agent that at least one new response is available;
   displaying at least one of said one or more responses in a window on a computer desktop of the agent;
   displaying at least one link for selection by the agent;
   transferring at least one of said one or more responses to at least one external system;
   storing said at least one of said one or more responses;
   alerting another contact center about at least one of said one or more responses;
   requesting additional information from said agent or said customer as indicated by at least one of said one or more responses;
   generating display of a task-specific form for agent input; and
   suggesting transfer of the interaction to an identified source for handling.

12. A computer system having at least one processor for automatically creating responses in realtime during an interaction between a contact center customer and a contact center agent when executed in a computing environment having at least one processing unit comprising:
   a speech record component for obtaining a speech record of a conversation between said contact center agent and said contact center customer;
   a speech transcription component for transforming said speech record to a text record;
   an issue identification component for analyzing said text record, for identifying one or more customer issues based on the analyzing, for determining that the one or more customer issues require handling by one or more of at least one response generating component based on the analyzing, for generating an enriched text record, comprising the text record with identified issues, and for sending the enriched text record to one or more of at least one response generating component; and
   at least one response generating component for generating one or more responses per identified customer issue and for outputting said one or more responses to the contact center agent for agent use in interacting with the customer.

13. The system of claim 12 wherein said interaction comprises at least one of telephony, e-mail, web forms, instant messaging, and computer text input and wherein the system further comprises at least one text extraction component for extracting a text stream from said text input for inclusion in the text record.

14. The system of claim 12 further comprising a feedback engine for receiving and processing agent feedback to said one or more responses and providing the processed agent feedback to the speech record component.

15. The system of claim 14 further comprising at least one storage location for storing said feedback.

16. The system of claim 12 wherein said response generation component includes one or more components for performing at least one of:
   signaling to said agent that at least one new response is available;
   displaying at least one of said one or more responses in a window on a computer desktop of said agent;
   displaying at least one link for selection by the agent;
   transferring at least one of said one or more responses to at least one external system;
   storing said at least one of said one or more responses;
   alerting another contact center personnel about at least one of said one or more responses;
   requesting additional information from said agent or said customer as indicated by at least one of said one or more responses;
   generating display of a task-specific form for agent input based on said one or more responses; and
   suggesting transfer of the interaction to an identified source for handling.

17. The system of claim 12 further comprising at least one normalization component for performing on the text record at least one of: removing disfluencies from the said text record; normalizing vocabulary in said text record; normalizing alphanumeric characters in said text record; detecting sentence boundaries in said text record; adding punctuation marks at said sentence boundaries; capitalizing letters in said sentences; and detecting call segment boundaries to generate an interaction log and wherein the issue identification component generates an enriched interaction log comprising the interaction log and identified issues.

18. The system of claim 12 wherein said contact center agent is one of a human working in a contact center or a computer-based agent in a contact-center self-service system.

19. The system of claim 17 wherein said enriched interaction log is provided to said at least one response generating component and wherein the system further comprises a response generating component interface to output said enriched interaction log and said one or more responses from said at least one response generating component for presentation.

20. A non-transitory computer program readable medium for storing a program of instructions executable by one or more processing units for performing a method for automatically creating responses in real time during a interaction between a contact center customer and a contact center agent, said method comprising one or more processing units executing the steps of:
- a) obtaining a speech record of a conversation between the customer and the agent; b) transforming said speech record to a text record with a speech transcription system;
- c) analyzing said text record to identify identifying one or more customer issues from said text record, to determine whether the one or more customer issues require handling by one or more of at least one decision-proposing component based on the analyzing, to generate an enriched text record, comprising the text record with identified issues, and to send the enriched text record to one or more of at least one response generating component;
- d) said at least one decision-proposing component generating one or more responses per identified customer issue; and
- e) outputting said one or more responses to said contact center agent for agent use in interacting with the customer.

* * * * *